(12) United States Patent
Barnreiter et al.

(10) Patent No.: US 6,189,396 B1
(45) Date of Patent: Feb. 20, 2001

(54) CONTROL ARRANGEMENT FOR AN AUTOMATIC, ELECTROHYDRAULICALLY CONTROLLED TRANSMISSION

(75) Inventors: Karl Barnreiter, Hitzhofen; Hans-Peter Fleischmann, Stammham; Johann Markl, Nassenfels; Hans-Jurgen Rudolph, Neuburg; Michael Genzel, Rosstal; Roger Pohlmann, Nuremberg; Armin Gottschaller, Neumarkt; Thomas Schmid, Nuremberg; Werner Flierl, Sulzbach Rosenberg, all of (DE)

(73) Assignee: Audi AG, Ingolstadt (DE)

( * ) Notice: Under 35 U.S.C. 154(b), the term of this patent shall be extended for 0 days.

(21) Appl. No.: 09/119,222

(22) Filed: Jul. 20, 1998

Related U.S. Application Data

(63) Continuation of application No. PCT/EP97/00521, filed on Feb. 6, 1997.

(30) Foreign Application Priority Data

Feb. 10, 1996 (DE) .............................................. 196 04 948

(51) Int. Cl.$^7$ .................................................. F16H 59/00
(52) U.S. Cl. .............................................................. 74/335
(58) Field of Search .................................... 74/606 R, 335

(56) References Cited

U.S. PATENT DOCUMENTS

| | | | |
|---|---|---|---|
| 3,703,107 | * | 11/1972 | Piret ............................... 74/606 R X |
| 3,772,933 | * | 11/1973 | Prenzel et al. ......................... 74/335 |
| 4,616,521 | * | 10/1986 | Akashi et al. ....................... 74/335 X |
| 4,693,143 | * | 9/1987 | Harada et al. ..................... 477/908 X |
| 4,722,237 | * | 2/1988 | McNinch, Jr. ...................... 74/335 X |
| 4,805,490 | * | 2/1989 | Fuehrer et al. ................ 74/606 R X |
| 4,899,607 | * | 2/1990 | Stainton ................................ 74/335 |
| 4,967,621 | * | 11/1990 | Soga et al. ............................... 477/49 |
| 5,101,677 | * | 4/1992 | Hammerschmitt ...................... 74/335 |
| 5,307,013 | * | 4/1994 | Santos et al. ....................... 324/207.2 |
| 5,417,124 | * | 5/1995 | Huff et al. .............................. 74/335 |
| 5,466,055 | * | 11/1995 | Schmitt et al. .................... 303/119.2 |

(List continued on next page.)

OTHER PUBLICATIONS

Engelsdorf, et al., "Electronic CVT Control for Power Train Optimization." In: Proceedings of the International Conference on Continuously Variable Power Transmissions, Sep. 11–12, 1996, Yokohama, Japan, No. 9636358, pp. 71–76.*

Hettich et al., "A New Integrated Controller Concept for CVT." In: Proceedings of the International Conference on Continuously Variable Power Transmissions, Sep. 11–12, 1996, Yokohama, Japan, No. 9636367, pp. 77–81.*

Primary Examiner—Charles A Marmor
Assistant Examiner—Roger Pang
(74) Attorney, Agent, or Firm—Lalos & Keegan; Michael N. Lau

(57) ABSTRACT

The invention concerns a control arrangement for an automatic electrohydraulically controlled transmission. In order to reduce expenditure on parts and assembly, the hydraulic control system and electronic control system are mounted directly adjacent each other and plug-in connections are provided between the solenoid valves of the hydraulic control system and the electronic control system. The hydraulic control system (20) substantially comprises two duct panels (28,30) in which control ducts, piston slides and solenoid valves (not shown) are disposed for controlling the conical plates and couplings of the transmission. The pressurized hydraulic fluid is fed directly into these duct panels from the pump (29). The electronic control system (22) has a single central connection (36) which is secured in the transmission housing cover (42) by an annular seal. Rotational speed sensors for the transmission shafts and temperature and pressure sensors are integrated into the control unit.

10 Claims, 4 Drawing Sheets

U.S. PATENT DOCUMENTS

| | | | | |
|---|---|---|---|---|
| 5,611,372 | * | 3/1997 | Bauer et al. | 74/606 R X |
| 5,621,317 | * | 4/1997 | Wozniak | 74/473 R X |
| 5,660,080 | * | 8/1997 | Rector et al. | 74/473 R |
| 5,709,134 | * | 1/1998 | Ulm | 74/606 R |
| 5,749,060 | * | 5/1998 | Graf et al. | 477/72 X |
| 5,845,544 | * | 12/1998 | Huggins et al. | 74/606 R |
| 5,845,545 | * | 12/1998 | Braun et al. | 74/606 R |
| 5,867,092 | * | 2/1999 | Vogt | 74/335 X |
| 5,941,137 | * | 8/1999 | Beer et al. | 74/606 R |

\* cited by examiner

CONTROL ARRANGEMENT FOR AN AUTOMATIC, ELECTROHYDRAULICALLY CONTROLLED TRANSMISSION

This application is filed in the United States is a continuation of PCT/EP97/00521 filed on Feb. 6, 1997.

The invention pertains to a control arrangement for an automatic, electrohydraulically controlled transmission, especially for motor vehicles.

In such automatic transmissions in motor vehicles, the hydraulic control, as well as various sensors for pressure and rpm, are integrated into the transmission and are connected via corresponding lines to the electronic control unit that is located outside of the transmission. This leads to very high assembly and parts costs, as well as a certain vulnerability to malfunctions due to possible line breaks.

The object of the invention is to propose a reduced-cost, easy-to-assemble, highly reliable arrangement of the hydraulic and electronic controls of the automatic transmission.

According to the invention, it is proposed that the hydraulic control and electronic control be built right next one another, in which case plug connections are provided between the solenoid valves of the hydraulic control and the electronic control. This can considerably reduce the line costs because the plug connections can be hard-wired in the electronic control unit or integrated into circuit boards and directly connected to the solenoid valves or their plug connectors.

Moreover, sensor arms can extend downward from the electronic control that ensure contactless sensing of the shaft-mounted transducer wheels of the input and output shafts of the automatic transmission past the hydraulic control. This ensures that the rpm sensors are also directly incorporated into the electronic control unit.

As a logical enhancement, at least one pressure sensor can also be arranged right in the electronic control unit that is connected to the control duct of the hydraulic control that is to be sensed in a fluid-tight manner, e.g., via a plug connector with a sealing ring.

With the aid of an integrated temperature sensor, the temperature of the hydraulic fluid can also be monitored in order, for example at low temperatures, to trigger a warm-run program and at excessively high temperatures to trigger intervention into the switching time of the starter coupling and/or power-reducing run programs in the electronic control.

At the electronic control there is preferably a single electric central connector through which the vehicle-specific control parameters, such as engine management, demand for power, etc. can be input and transmission data can be output. When the automatic transmission is being assembled or disassembled, with respect to the electric control it is therefore necessary only to close or detach one plug connector.

To ensure better accessibility of the hydraulic and electronic controls, these controls can be surrounded by a transmission cover, in which case a penetration in the cover tightly encases the central connection and makes it accessible from the outside.

To further simplify the assembly process, on the electronic control there can be another sensor that works directly together with a position transducer of a manually operated selector shaft that is swivel-mounted in the transmission. Thus, the shifting commands can also be directly input into the electronic control in a way that facilitates assembly. To ensure ease of production, the position transducer is preferably made of plastic, in which case for each selector position a magnetic element can be tied in to ensure contactless shift position sensing using the Hall effect system.

An embodiment of the invention is described in greater detail below with additional features. In the schematic drawings.

Figure 1:
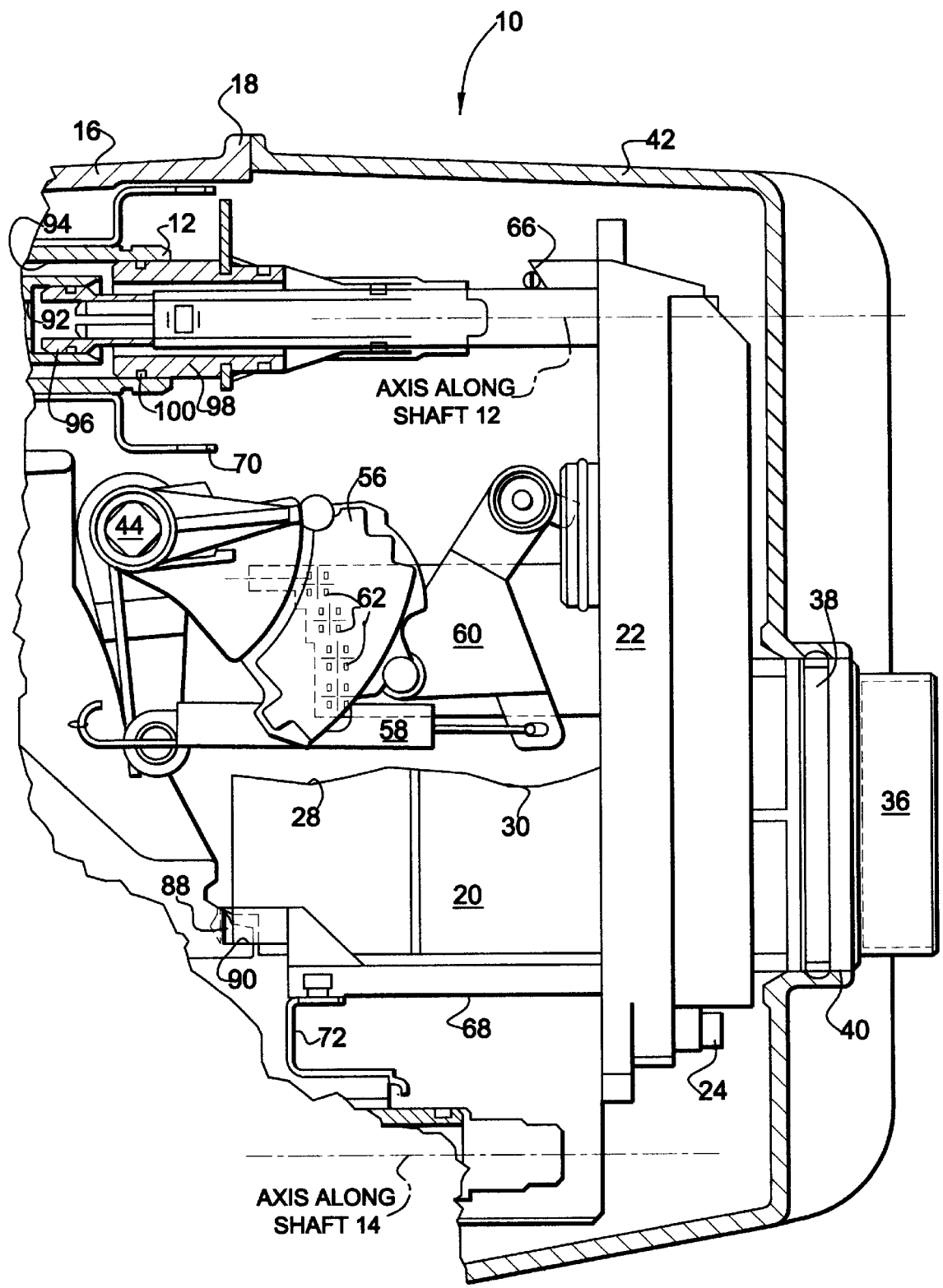
FIG. 1 shows a partial longitudinal section along the transmission driven shaft with cover and along the hydraulic and electronic controls of an automatic CVT transmission of a motor vehicle.
Figure 2:
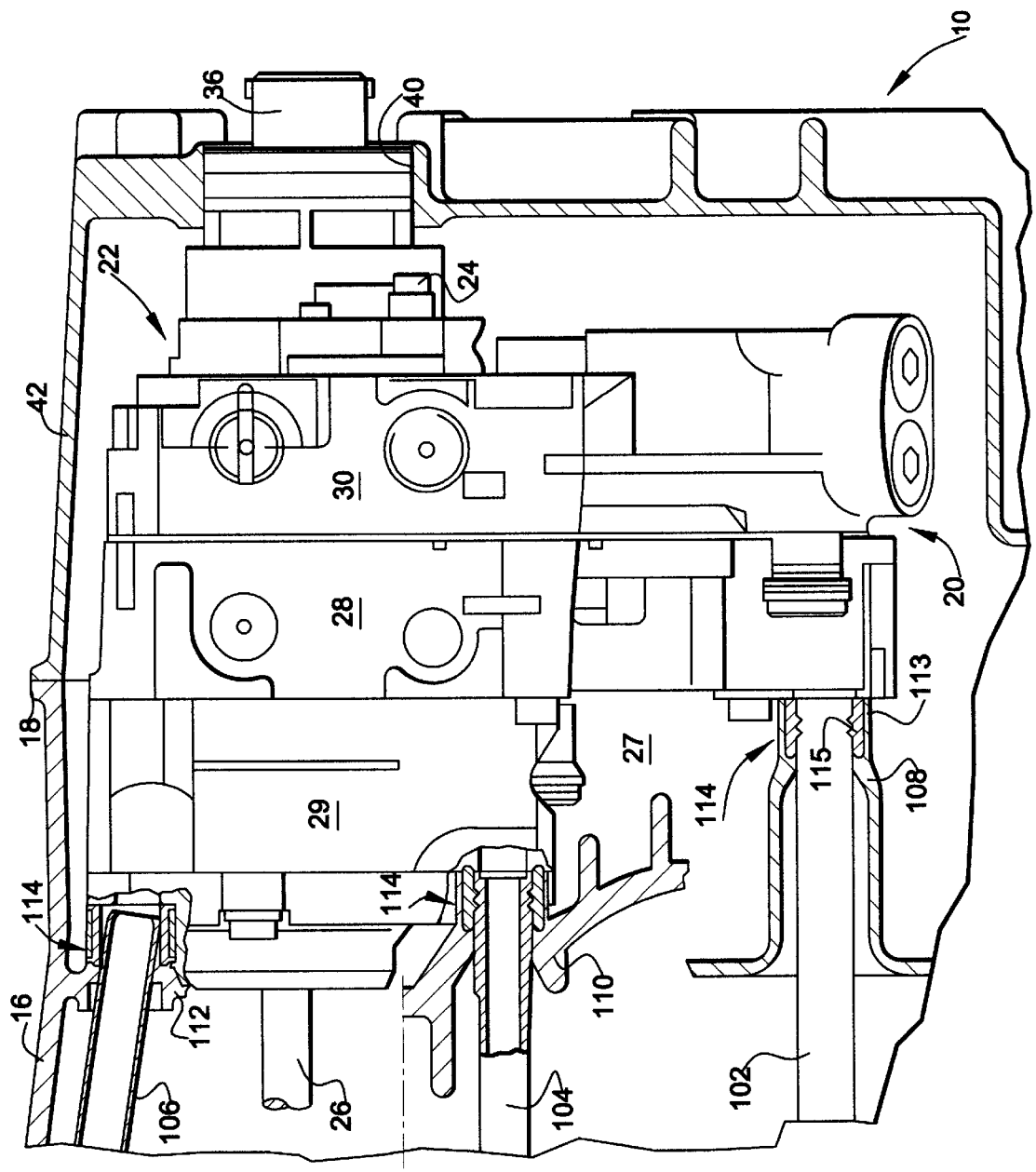
FIG. 2 shows another partial longitudinal section similar to FIG. 1, but along several hydraulic line connections between the hydraulic control and hydraulically controlled transmission couplings located in the transmission.
Figure 3:
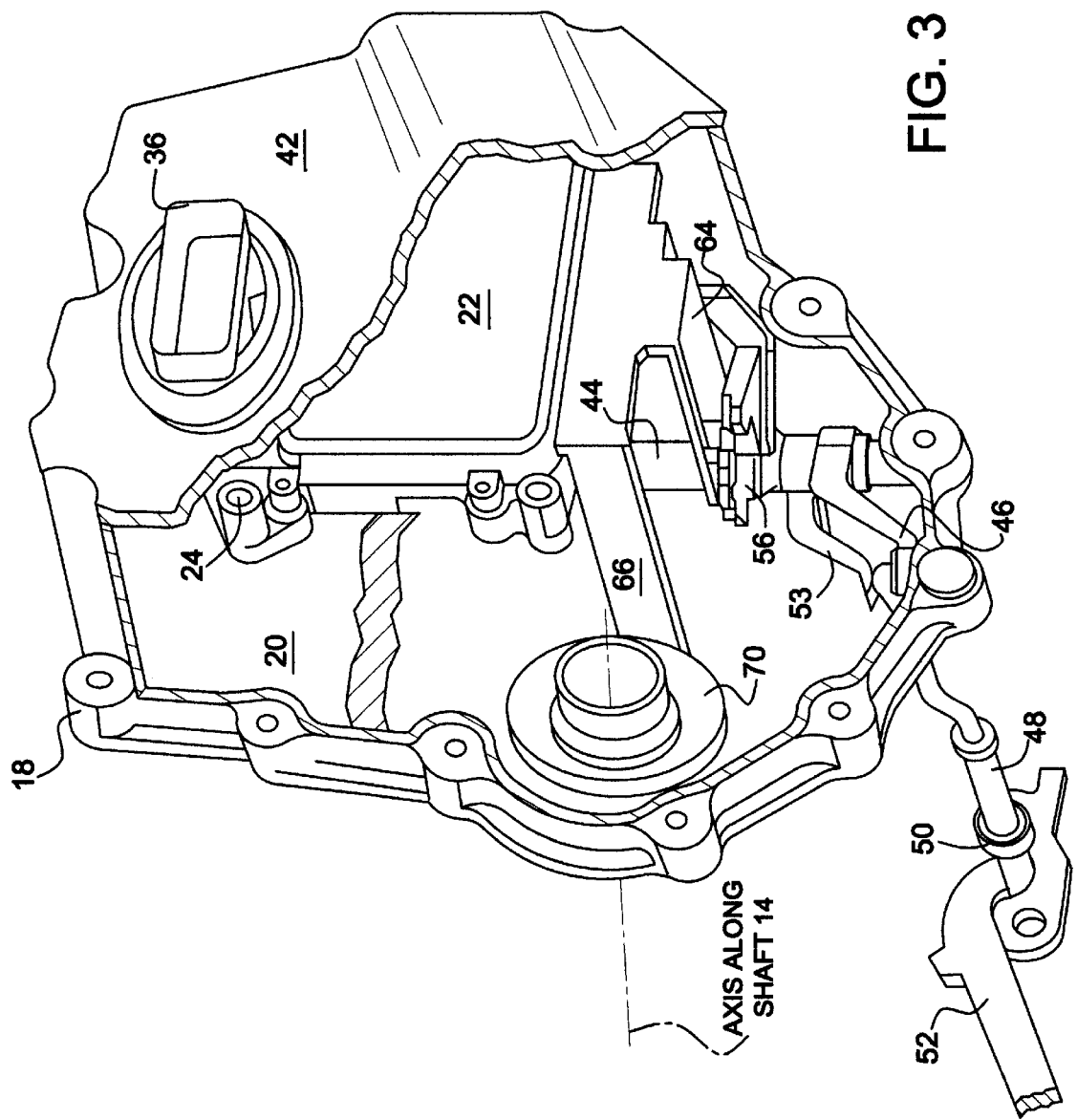
FIG. 3 shows, in a three-dimensional view, a cover-side view of the front transmission flange with the hydraulic and electronic controls and the transmission cover mounted, as well as with the transmission selector shaft also mounted.
Figure 4:
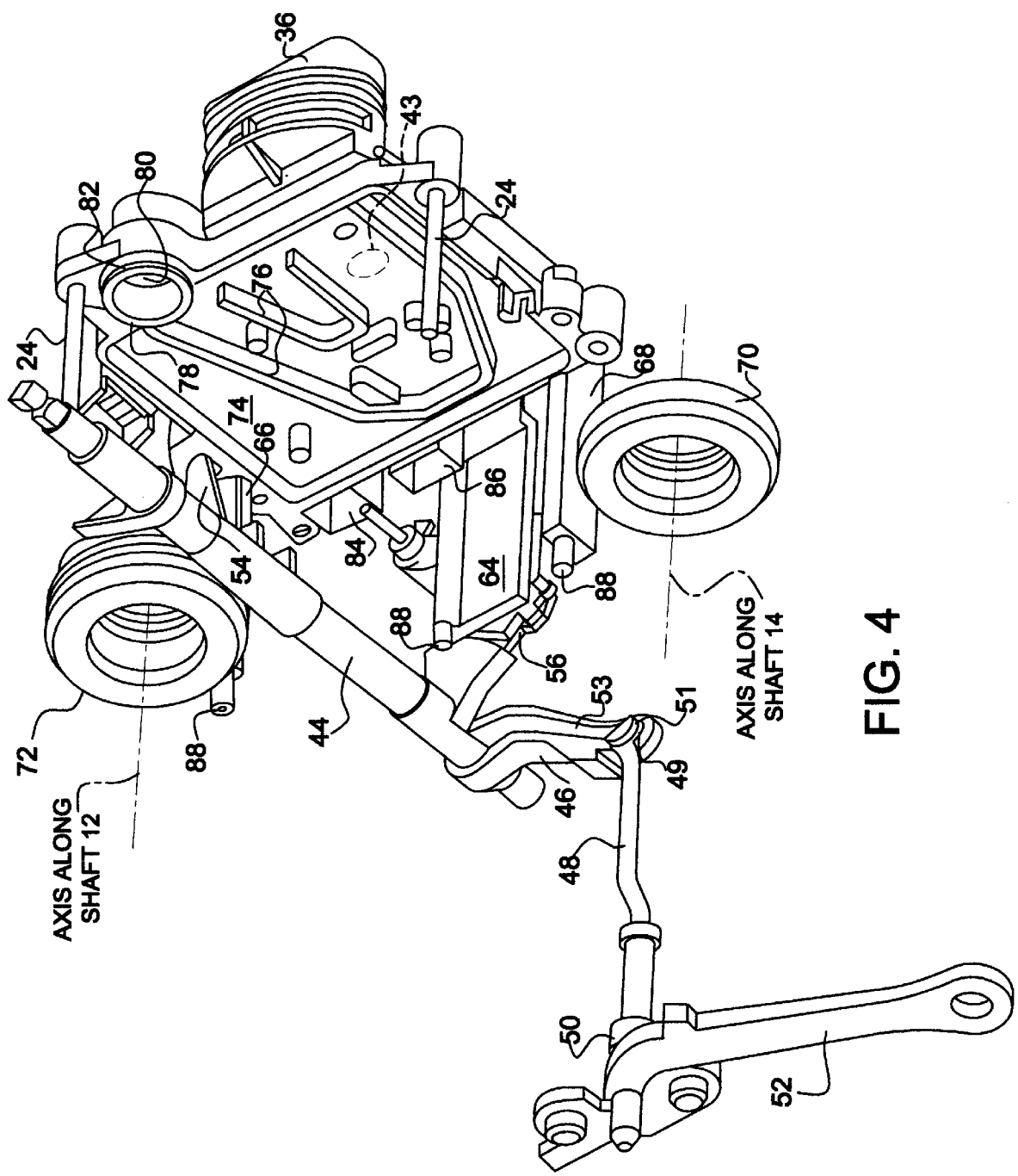
FIG. 4 shows another three-dimensional representation of the selector shaft and electronic control of the transmission-side view opposite that shown in FIG. 3.

Section 10, which is shown in FIGS. 1–4, is part of an electrohydraulically controlled CVT transmission with a drive shaft 12 and a driven shaft 14, on which drive and driven conical plates that can be adjusted with regard to their effective diameters and a strap means, e.g., a link conveyor, are arranged in order to ensure infinitely variable transmission ratio modification and contain the transmission component for reversing rotational direction (reverse gear) and hydraulically activated couplings for starting and changing direction. These gear components, not shown, are of a known conventional type.

At the end opposite the transmission input and output, housing 16 of the transmission ends in a front transmission flange 18 on which (cf. FIG. 2) a hydraulic pump 29, a hydraulic control 20, and an electronic control 22 are mounted right next to each other and are secured in place with the aid of screws 24 and alignment pins, not shown. In this case the hydraulic pump 29 lies in a recessed area 27 of the transmission flange 18, is screwed directly to the hydraulic control 20, and is driven on the transmission side via shaft 26, which is partially shown.

The hydraulic control 20 consists essentially of two duct plates 28, 30 in which control ducts, pistons slides, and solenoid valves (not shown) for controlling the conical plates and couplings of the transmission are arranged in a known way and into which the pressurized hydraulic fluid is injected directly from pump 29.

The electronic control 22, which is mounted directly on the hydraulic control 20, in a known way contains a CPU with the logical connecting circuits as well as characteristic stores for the selector programs and corresponding output amplifiers to control the solenoid valves in order to ensure hydraulic control of the transmission, in which case the vehicle-specific parameters such as engine management, demand for power (gas pedal position), etc., are fed by the vehicle through a central connector 36, in the form of a jack with the corresponding plug contacts, that is provided at the plate-like electronic control 22 and transmission signals are output (for instance, speed signal, monitoring signals, diagnosis, etc.).

In this case the central connector 36 extends via a ring-shaped seal 38 through a penetration 40 in a cover 42 that encases the hydraulic and electronic controls 20, 22. In turn, cover 42 is screwed to transmission flange 18, with a seal between them.

The electronic control 22 also has a chip 43 as a temperature sensor (cf. FIG. 4) which monitors the temperature of the hydraulic fluid. This allows quick, temperature-dependent intervention into the transmission control in order to trigger warm-run programs at, e.g., low temperatures (inputting shorter transmission ratios=higher engine rpm) or at high temperatures to trigger shorter coupling engagement times or to trigger run programs or engine intervention actions that reduce the load on the transmission.

In the transmission housing 16 a manually operated selector shaft 44 (cf. FIG. 4) is also swivel-mounted via a gear selector lever (not shown), whereby said selector shaft activates the catch 52 of a parking brake (not shown) of the transmission via a downward-extending arm 46 and a rod assembly 48 with a taper adapter 50. A spring-mounted safety arm 53 of selector shaft 44 holds the end 51 of rod assembly 48 that is bent at a 90 degree angle in the corresponding bearing bore 49 of arm 46. When rod assembly 48 is assembled, the spring-mounted arm 53 is to be raised accordingly until the bent end 51 can be forced into the bearing bore 49.

Another downward-pointing arm of the selector shaft 44 activates a selector slide (not shown) of hydraulic control 20.

Finally, the selector shaft 44 has a plastic-encased position transducer 56 which works together with a catch 60 that is pre-stressed by a spring 58 and in which a magnetic element 62 is embedded for each selector position (for example, the plastic can contain iron oxide powder, and the corresponding locations can be permanently magnetized locally).

Magnetic elements 62 ensure the contactless sensing of the selector positions of selector 44 based on the Hall effect, in which case a correspondingly shaped Hall sensor 64 (cf., in particular, FIG. 3) extends downward from the electronic control 22.

Additionally, there are arm-like rpm sensors 66, 68 which extend from the electronic control 22 past the hydraulic control 20 into the transmission housing 16 and which directly sense the rpm of these shafts with transducer wheels 70, 72 that are directly attached to the drive and driven shafts 12, 14. This can be achieved in a known way using the induction or Hall effect process.

The connection wall 74 (FIG. 4) of the electronic control 22 that faces toward the hydraulic control 20 also has cooling ribs 76 that are in a recessed area and is flushed and cooled by the hydraulic fluid via duct openings, not shown, in the hydraulic control 20. The chip 43 or the temperature sensor can also be arranged in the electronic control 22 at this connection wall 74. A ring-shaped projection 78 ensures that a pressure sensor 80 that is integrated into the electronic control 22 connects directly to the adjacent hydraulic control 20, in which case the projection 78 that has a sealing ring 82 extends tightly into a hole (not shown) that empties into the control duct to be sensed. The pressure in this control duct can thus be picked up directly via the pressure sensor 80 and processed accordingly in the electronic control. Although only one pressure sensor 80 is shown, multiple pressure sensors can also directly sense multiple control ducts.

Furthermore, connection wall 74 has electric plug connectors 84, 86 via which the solenoid valves, not shown, of the hydraulic control 20 can be electrically connected directly to the electronic control 22.

In order to secure the sensors 64, 66, 68 that extend downward from the electronic control 22 precisely relative to transducer wheels 70, 72 and relative to position transducer 56, at the free ends of the sensors are pins 88, which extend into corresponding holes 90 in the transmission flange 18.

The connection of the hydraulic control 20 to the transmission is provided, on the one hand, in order to control the conical plates and the infinitely variable transmission ratio via ducts or ring-shaped ducts 92, 94 (cf. FIG. 1, drive shaft 12) in the drive and driven shafts 12, 14 in which case pipe sockets 96, 98 that extend downward from the hydraulic control 20 are inserted into these ducts 92, 94 with sealing piston rings 100 between them; because of the piston rings 100 that are used, the components that are to be sealed can turn relative to one another.

On the other hand, to ensure the hydraulic supply of the couplings and, if necessary, to hook up a hydraulic pump, supply lines 102, 104, 106 that run freely in the transmission housing 16 are provided that are inserted into receptacles that are provided in the transmission housing 16 and extend them toward the hydraulic control 20, in which case a ring-shaped sealing sleeve 114 that is mounted on each of supply lines 102, 104, 106 and that has an outer clamping sleeve 113 and an elastic sealing ring 115 with radially and axially extended sealing lips ensures a tolerance-safe seal between the connection surfaces of the hydraulic control 20 and the receptacles 108, 110, 112 in the housing and supply lines 102, 104, 106.

As the drawing shows, all sealing and plug connections are arranged parallel to the drive and driven shafts 12, 14, so that, simply by mounting the possibly already pre-mounted control block from the hydraulic control 20 and electronic control 22 and then attaching with screws 24, all hydraulic and electrical connections and plug-ins are made inside the transmission. After the cover 42 is mounted, the only thing to do is to connect the vehicle-side central plug to the corresponding central connector 36.

The invention is not restricted to the embodiment described above. Thus, for example, instead of a CVT transmission it is also possible to use an automatic step reduction gear, for example, a planetary gear system.

What is claimed is:

1. An automatic electrohydraulically controlled transmission for motor vehicles, comprising:
   a drive shaft and a driven shaft;
   a hydraulic control with a pump directing hydraulic fluid; and
   an electronic control controlling the hydraulic control in accordance with a plurality of input parameters and rpm sensing of the shafts;
   wherein the hydraulic control is placed immediately adjacent to the electronic control; a plurality of plug connections are provided between the hydraulic control and the electronic control; and a plurality of sensor arms extend downward past the hydraulic control of a plurality of transducer wheels attached to the drive shaft and driven shaft to ensure contactless sensing.

2. An automatic electrohydraulically controlled transmission according to claim 1, wherein a plurality of free ends of the sensor arms are located in a plurality of holes.

3. An automatic electrohydraulically controlled transmission according to claim 2, wherein at the free ends of the sensor arms, a plurality of pins are formed that are insertable into the plurality of holes of a transmission flange.

4. An automatic electrohydraulically controlled transmission according to claim 1, wherein at the hydraulic control, there is at least one open control duct directly covered by a pressure sensor of the electronic control.

5. An automatic electrohydraulically controlled transmission according to claim 1, wherein in the electronic control, a temperature sensor is integrated to monitor temperature of the hydraulic fluid.

6. An automatic electrohydraulically controlled transmission according to claim 1, wherein at the electronic control, there is a central connector for communicating a plurality of transmission to vehicle-specific control parameters.

7. An automatic electrohydraulically controlled transmission according to claim 6, wherein the hydraulic and electronic controls are surrounded by a transmission cover, and wherein a penetration in the cover seals off the central connector.

8. An automatic electrohydraulically controlled transmission according to claim 1, wherein at the electronic control, there is another sensor working directly with a position transducer of a manually activated shaft that is swivel-mounted in a transmission housing.

9. An automatic electrohydraulically controlled transmission according to claim 8, wherein the position transducer is encased in plastic and has a magnetic element for each of a plurality of selector positions to ensure contactless sensing of any selector position.

10. An automatic electrohydraulically controlled transmission for motor vehicles, comprising:
    a drive shaft and a driven shaft;
    a hydraulic control with a pump directing hydraulic fluid; and
    an electronic control controlling the hydraulic control in accordance with a plurality of input parameters and rpm sensing of the shafts;
    wherein the hydraulic control is placed immediately adjacent to the electronic control; a plurality of plug connections are provided between the hydraulic control and the electronic control; and at the electronic control, there is another sensor working directly with a position transducer of a manually activated shaft that is swivel-mounted in a transmission housing.

* * * * *

UNITED STATES PATENT AND TRADEMARK OFFICE
CERTIFICATE OF CORRECTION

PATENT NO.    : 6,189,396 B1
DATED         : February 20, 2001
INVENTOR(S)   : Karl Barnreiter et al.

It is certified that error appears in the above-identified patent and that said Letters Patent is hereby corrected as shown below:

<u>Title page,</u>
Item [73], add the following assignee:

-- Temic Telefunken Microelectronic GmbH, Heilbronn (DE) --

Signed and Sealed this

Tenth Day of September, 2002

Attest:

Attesting Officer

JAMES E. ROGAN
*Director of the United States Patent and Trademark Office*